(12) United States Patent
Marchant

(10) Patent No.: US 6,264,868 B1
(45) Date of Patent: Jul. 24, 2001

(54) METHOD FOR MAKING HOLLOW PARTS OF COMPOSITE MATERIAL

(75) Inventor: Pascal Eric Jean Marchant, Le Havre (FR)

(73) Assignee: Society Hispano Suiza Aerostructures, Paris (FR)

( * ) Notice: Subject to any disclaimer, the term of this patent is extended or adjusted under 35 U.S.C. 154(b) by 0 days.

(21) Appl. No.: 09/180,276
(22) PCT Filed: Mar. 5, 1998
(86) PCT No.: PCT/FR98/00433
§ 371 Date: Jan. 29, 1999
§ 102(e) Date: Jan. 29, 1999
(87) PCT Pub. No.: WO98/39151
PCT Pub. Date: Sep. 11, 1998

(30) Foreign Application Priority Data

Mar. 6, 1997 (FR) .................................... 97 02664

(51) Int. Cl.⁷ .................................... B29C 33/52
(52) U.S. Cl. .................... 264/221; 264/257; 264/258; 264/275; 264/317; 264/DIG. 44
(58) Field of Search .................. 264/219, 221, 264/313, 317, 275, 257, 258, DIG. 44; 249/61, 65, 178

(56) References Cited

U.S. PATENT DOCUMENTS

| | | | |
|---|---|---|---|
| 3,094,422 | * | 6/1963 | Reinhold ................... 264/DIG. 44 |
| 4,155,970 | * | 5/1979 | Cassell ........................ 264/137 |
| 4,202,856 | * | 5/1980 | Frikken et al. ................ 264/221 |
| 4,271,116 | * | 6/1981 | Jones .......................... 264/221 |
| 4,424,183 | * | 1/1984 | Nelson ........................ 264/221 |
| 4,614,627 | * | 9/1986 | Curtis et al. ................ 264/46.6 |
| 4,615,855 | * | 10/1986 | Orlowski et al. ............. 264/221 |
| 4,683,099 | * | 7/1987 | Buxton et al. ............... 264/511 |
| 4,808,360 | * | 2/1989 | Natori et al. ................ 264/221 |
| 5,125,993 | * | 6/1992 | Principe ..................... 156/155 |
| 5,126,089 | * | 6/1992 | Johnson et al. .............. 264/221 |
| 5,131,834 | * | 7/1992 | Potter ........................ 425/389 |
| 5,248,552 | * | 9/1993 | Moore et al. ................ 428/323 |
| 5,262,100 | * | 11/1993 | Moore et al. ................ 264/25 |
| 5,286,438 | * | 2/1994 | Dublinski et al. ............ 264/220 |
| 5,292,475 | * | 3/1994 | Mead et al. ................. 264/257 |
| 5,817,269 | * | 10/1998 | Younie et al. ............... 264/258 |

OTHER PUBLICATIONS

Modern Plastics Mid–October Encyclopedia, p. 637, 1992.*

* cited by examiner

Primary Examiner—Jan H. Silbaugh
Assistant Examiner—Stefan Staicovici
(74) Attorney, Agent, or Firm—Bacon & Thomas

(57) ABSTRACT

A method for manufacturing a hollow component made of composite materials, in particular a hot-polymerizing resin/fiber composite. The component (1) comprises enclosing walls (3) which subtend at least one cavity (2). The method uses a mold (7) which assumes the outside shape of the component (1) and comprises the following steps: manufacturing at least one core (11) which corresponds to the shape of the at least one cavity (2), the at least one core (11) comprising a body (12) clad by a silicone-elastomer layer (13) having a high thermal expansion coefficient α and an appropriate thickness "e"; cladding the at least one core (11) with at least one resin preimpregnated layer of fiber to form the composite (6) of the component (1), the resin having a curing temperature $T_1$; arranging the at least one core and the composite (6) in the mold (7); hot-polymerizing the resin such that the at least one core (11) exerts an outward compression, generated by thermal expansion during resin polymerization, against the composite (6); and disintegrating the silicone-elastomer layer (13) during resin polymerization with the silicone-elastomer layer (13) having a disintegration temperature T which is less than the curing temperature $T_1$ of the resin.

15 Claims, 2 Drawing Sheets

METHOD FOR MAKING HOLLOW PARTS OF COMPOSITE MATERIAL

BACKGROUND OF THE INVENTION

1. Field of the Invention

The invention relates to methods for manufacturing hollow components made of laminated composite materials, particularly laminated composite materials comprising reinforcing fiber layers embedded in a hot-polymerized resin. More specifically, it relates to manufacturing methods using cores to form the components' cavities.

The invention also relates to methods for manufacturing such hollow components having walls enclosing the cavities which are adjacent to non-enclosing walls, which do not subtend the cavities.

2. Description of the Related Art

Laminated composite components comprising reinforcing fiber layers embedded in a hot-polymerizing resin are used, in particular, in the automobile, space and aeronautic industries because of their excellent strength-to-weight ratio. In general, the reinforcing fibers are carbon fibers or silicon carbide fibers and the resins are epoxides, bismaleimides or poly-imides. In particular, one seeks to manufacture components such as reservoirs, ducts, air manifolds etc. with the demands of material quality, surface condition, mechanical and thermal strength, and high dimensional accuracy. These components comprise thin enclosing walls; that is, walls enclosing and subtending cavities, which may possibly communicate with the outside through minute apertures. Such components are desired to have the enclosing walls adjacent to non-enclosing walls (ones not subtending cavities). Illustratively, they may be a casing comprising an air manifold at its surface.

A well known procedure for making hollow components composed of fiber/resin laminated composites uses a mold matching the outer shape of the component and generally being at least in two parts for the purpose of removing the component. This known procedure in particular includes the following essential operations:

- making a core in the shape of the component's cavity;
- arranging an inflatable balloon around the core;
- cladding the core; that is, placing the resin-preimpregnated reinforcing fibers constituting the composite around the combination of the core and the balloon;
- arranging the combination of the core, the balloon and the composite in the mold;
- hot-polymerizing the resin with the balloon being pressurized;
- hot removal of and cooling of the component;
- withdrawing the core; and
- withdrawing the balloon through the cavity aperture.

The core's melting point may be lower than the onset temperature of resin-polymerization, for instance paraffin or wax. Following the enclosing process, the core may be withdrawn in molten form. Moreover, resin cores are known which dissolve in an organic solvent; thus, after component removal and cooling, the core may be removed in dissolved form from the cavity. However, this procedure has the drawback of degrading the resin of the component, hence the component's surface quality and its strength. Moreover, water-soluble ceramic cores are known. This latter approach appears to be the most appropriate one for the case under consideration. Pressurizing the balloon allows pushing and compressing the composite against the wall of the mold to reduce the inherent swelling of the preimpregnated fiber layers. The expression "swelling" herein denotes the additional thickness of the preimpregnated fiber layers before compression. In this manner, a homogeneous material is produced free of micro-cavities between the fibers. Typical pressures run between 8 and 15 bars, the thickness of the composite thus being reduced by between 15 and 30%. In other words, a density increase, i.e. compaction, is involved.

Nevertheless, this technique has the following intrinsic drawbacks:

1) the inside surfaces are rough and fairly inaccurate because the pressurized balloon follows the deviations in the cladding; furthermore, the balloon poorly pushes the composite into the angular recesses such that the component consequently remains imprecise at those sites;
2) removal of the balloon after molding may be difficult when the cavity is large and the aperture small, thus constraining the designer to provide adequate aperture dimensions;
3) the balloon must be kept in perfect condition; that is, it must remain sealed and its flexibility must be preserved as long as the resin is above its solid-state polymerizing temperature; however, some resins, such as the polyimides which are kept at high temperatures, have polymerization melting points higher than 300° C. The inventor is unaware of any elastomers with which to make balloons withstanding such temperatures; consequently, the procedure cannot be carried out using such resins.

The components consisting of thin and non-enclosing walls (walls not forming cavities) are conventionally manufactured by a so-called "bag" molding technique using an open mold in the shape of the wall, more specifically in the shape of one of the two surfaces of the wall. This procedure in particular comprises the following stages:

- cladding; that is, applying the resin-impregnated fiber layers against the mold to form the composite;
- covering the composite with a film which is impermeable relative to the mold, the expert previously having arranged a conduit connected to a partial-vacuum source as well as different fabrics which promote evacuation and removal (such techniques are mentioned merely for elucidation but are unrelated to the implementation of the invention);
- hot, autoclave polymerization at the required temperature and pressure, the pressure in the autoclave forcing the composite, by the film against the mold surface, to compact this composite and to shape it as required.

However the bag-molding technique cannot be combined with the balloon-molding technique to manufacture an integral component comprising at least one first hollow part (derived by the balloon molding technique) and at least one thin wall not forming a cavity (derived by the bag molding technique). At least one portion of the enclosing wall subtending the cavity will simultaneously be between the bag and the balloon, that is between two pressurized flexible membranes. That wall portion will assume a significantly random shape even when there is rigorous equilibrium between the pressure exerted on the bag and that on the balloon, for instance, when bag and balloon are made to communicate. Consequently, the geometry of a component manufactured by such a combined technique will always be unreliable.

SUMMARY OF THE INVENTION

The invention proposes a method for manufacturing hollow components made of a hot-polymerizing resin-fiber composite which is free of the drawbacks of the balloon manufacturing method, the component comprising enclosing walls subtending at least one cavity, the method using a mold matching the external shape of the component and comprising, in particular, the following stages:

a) manufacturing a core of a shape which corresponds to that of the cavity to be made;

b) cladding the core with at least one layer of resin-preimpregnated fibers to form a fiber composite;

c) arranging the core clad in the composite in the mold; and d) hot-polymerizing the resin.

Such a method is characterized in that the core applies an outward compression, exerted by its thermal expansion during resin polymerization, on the composite. The core comprises a body covered by layer of silicone elastomer of a high thermal coefficient of expansion a and of a thickness "e" appropriate for the compression percentage applied to the composite.

Conventionally, the silicone elastomer is used as a seal. The invention makes use of a special property of this material, namely a very high coefficient of thermal expansion up to $1,000 \times 10^{-6}/° C$. Contrary to the case of a core enclosed by a pressurized balloon, the dual-element core of the invention expands thermally as a solid body, thereby imparting its shape to the composite which it compresses against the mold's surface.

Depending on the core rather than on the cladding, the inside surfaces so made are uniform and accurate. The angular recesses are easily shaped because the cores, which have a shape complementary to that of the mold, penetrate the angular recesses and force the composite against the inside mold surfaces in a wedge-like manner. In this manner, the first drawback of the balloon molds is eliminated.

It is understood that such a result is made possible by the very high coefficient of thermal expansion of the silicone elastomer. Given the dimensions L1 and the thickness of the walls of the finished component, the reduction of wall thickness to be carried out during polymerization, the polymerization temperature T1, the coefficients of thermal expansion of the materials constituting the silicone elastomer layer, the body of the core, the mold and the polymerized composite, namely and respectively, $\alpha_1, \alpha_2, \alpha_3$ and $\alpha_4$, the expert easily determines the core dimensions L2 and the thicknesses "e" of the silicone elastomer constituting the periphery of the core. Generally $\alpha_4$ is comparatively minute and may be neglected. Because the invention's compression of the composite is carried out to a specified volume, not at a given pressure as in the balloon molding procedure, the expert will empirically determine the appropriate wall thickness. For a suitable composite quality, this reduction should be at least 30% of the composite's thickness before compression. This compression ratio may be lowered if the component walls have been previously compacted before polymerization, for instance, in a vacuum. In such a case, however, preferably the invention shall be used to maintain a compression ratio at least 15% of the thickness of the composite in order to preserve an appropriately high-quality outcome.

The invention offers the advantage of easy insertion of the cold core without wrinkling the reinforcing fibers of the end-product component.

The compression imparted by the core of the invention requires that the thickness "e" of the elastomer layer be at least 3 mm and that the coefficient of thermal expansion be at least $1,000 \times 10^{-6}/° C$. However, this thickness may not exceed 10 to 15 mm because the elastomer would behave like a fluid and non-uniform surfaces would result. Also, chemical phenomena such as oil releases might occur during polymerization.

The hardness of the silicone elastomer is not critical. However, it should be at least 45 Shore to improve the uniformity of the surfaces created.

Advantageously, the selected silicone elastomer will disintegrate at a temperature T which is less than the resin's curing temperature T2. In this manner, the silicone elastomer will disintegrate during resin polymerization and subsequently is easily removed from the component's cavities, for instance, by rinsing with a jet of hot water. This feature remedies the second drawback of balloon molding.

Furthermore, the method of the invention allows polymerizing components at temperature higher than the ordinary operational temperatures of the silicone elastomers, thereby eliminating the third drawback of balloon molding technique.

Advantageously again, the core's body may comprise a water-soluble ceramic to allow easy removal of the body by mere dissolution in water without thereby changing the material of the finished component. Yet another advantage of the invention is making it possible to remove the core in a single rinsing operation.

Moreover, the silicone elastomer enclosing the soluble core will, at the end of the polymerization cycle, subtend a space around this soluble core inside the component's cavity and, as a result, will accelerate the core's elimination by dissolution because the solvent in such a case can completely surround the core from the onset of dissolution. This feature is preserved even when the cavity so formed is fitted with only a minute aperture to the outside.

Advantageously again, the components can be molded even without apertures in the enclosing walls between the cavities and the outside. In such a case, manufacture is simplified. To remove the core from the component cavities, it is enough that, following component molding, one hole—which may be small—is drilled into each cavity to remove the core body by water-dissolution and to eliminate, using a water jet, the disintegrated silicone elastomer layer.

The manufacture of the core of the invention entails a difficulty in that the thickness of the silicone-elastomer layer enclosing the core must be accurate at all points on the core surface, though it may vary from one point to another.

The invention furthermore proposes manufacturing cores by using a mold shaped to correspond to the core and by operating as follows:

manufacture of the core's body;

arranging the body in the mold, spacers made of crosslinked, that is polymerized, silicone elastomer being placed between the body and the mold's walls, each spacer being of the thickness of the silicone elastomer layer required at that location;

pouring liquid silicone elastomer into the space left free between the core and the mold's wall; and cold crosslinking the silicone elastomer followed by removal from the mold.

Advantageously, a so-called "rechargeable" silicone is used. Accordingly, when crosslinking, chemical bonds will form between the already crosslinked silicone-elastomer spacers and the silicone elastomer being crosslinked. Therefore, the silicone-elastomer layer so produced is perfectly homogeneous in structure and in thermal and mechanical properties.

Consequently, another advantage offered by the invention is the simplicity and lower cost of core manufacture compared with the prior-art's combination of core and balloon.

The invention also proposes a method for manufacturing complex components of a hot-polymerizing resin-fiber composite, the components comprising enclosing walls subtending at least one cavity and further comprising walls which do not subtend a cavity and are adjacent to the walls that do. Such a method is characterized by using a mold comprising surfaces imparting the shape of the non-enclosing walls and further comprising a mold cavity shaped like the enclosing walls, and comprising the following stages:

a) manufacturing a core to be shaped like the component's cavities;

b) cladding the mold, that is the shaping surfaces and the mold-cavities, with at least one layer of resin-preimpregnated fibers to constitute a first composite layer;

c) arranging the core in the mold-cavities above the first composite layer;

d) cladding the above assembly with at least one second layer of resin-preimpregnated fibers to constitute a second composite layer, the core thus being trapped between the two composite layers;

covering the combination of the composite and the core with a film to seal it with respect to the mold;

compression and hot-polymerization in an autoclave, wherein, during resin polymerization, the core applies an outward compression caused by thermal expansion to the composite located on the side surfaces of the mold forms, and wherein the core comprises a body covered by a layer of silicone elastomer having a high thermal coefficient of expansion a and an appropriate thickness e.

Accordingly, all the walls of such components are compacted and shaped either between two solid surfaces, namely those of the mold and of the core, or against one solid surface by the autoclave pressure exerted on the film.

In particular, those portions of the walls which are located between the core and the film are shaped accurately, contrary to the inability of doing so in a combination of balloon molding and bag molding.

Advantageously, the core per se is clad by at least one layer of resin-preimpregnated fibers in order to increase the component's resistance to cracks through the cavity in those zones where the non-enclosing walls are adjacent to the enclosing ones.

The proposed improvements to the manufacture of simple hollow components also apply under the same conditions to the hollow portions of complex components.

BRIEF DESCRIPTION OF THE DRAWINGS

The invention and its advantages are elucidated in the illustrative and non-limiting embodiments and the attached Figure. shown below.

DETAILED DESCRIPTION OF THE PREFERRED EMBODIMENTS

Figure 1:
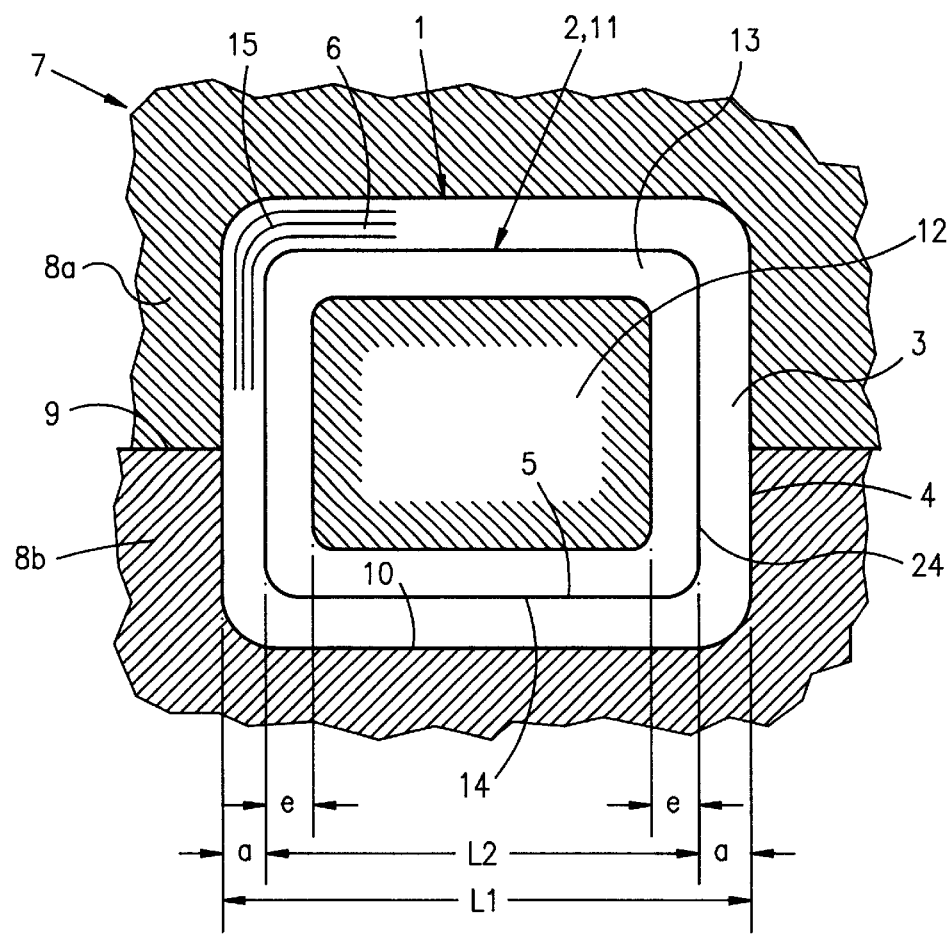
FIG. 1 illustrates the molding principle for a hollow component according to the invention, in this instance a reservoir, the wall thicknesses and the thicknesses of the silicone-elastomer layer having been exaggerated for clarity.

In FIG. 1, the component 1 is a reservoir comprising a cavity 2 subtended by an enclosing wall 3 having an outside surface 4 and an inside surface 5 bounding the cavity 2. The enclosing wall 3 comprises a composite 6 of reinforcing fibers embedded in a hot-polymerizing resin matrix. In this instance, the mold 7 comprises two half-molds 8a and 8b separated by a junction plane 9. The mold comprises an inner shaping surface 10 which is complementary to the outer surface 4 of the component 1 to be molded. A core 11 takes up the volume of the cavity 2 and comprises a water-soluble ceramic body 12 covered by a silicone-elastomer layer 13 having an outer surface 14 which is complementary to the inside surface 5 of the enclosing wall 3. The silicone-elastomer layer 13 is selected so that its disintegration temperature T is less than the resin's hardening temperature T1.

The mold 7 is made of a metal alloy and is therefore reusable. The component 1 is manufactured in the following manner:

manufacturing the core 11;

cladding the core 11, that is applying layers of resin-impregnated fibers on the core 11 to form the composite 6;

introducing the combination of the core 11 and the composite 6 into the mold 7;

carrying out the thermal hot-polymerization cycle of the resin, removal and cooling;

drilling a hole (not shown) in the enveloping wall 3 and removing the core 11, the body 12 and the silicone-elastomer layer 13, each being dissolved and eliminated by water rinsing.

The expert is well conversant with the thermal cycles and the specific techniques allowing the elimination of any gaseous and liquid components formed during polymerization; therefore, they are not discussed herein, for the sake of brevity.

During the polymerization cycle, the temperature of the combination of the mold 7, the composite 6 and the core 11 is gradually raised from the ambient temperature, namely 25° C., to the final resin-hardening temperature $T_1$. The silicone-elastomer layer 13 is of an appropriate thickness "e" and has a coefficient of thermal expansion $\alpha_1$ much larger than the respective coefficients of thermal expansion $\alpha_2$ and $\alpha_3$ of the body 12 and mold 7. The layer 13 expands on account of the rise in temperature and, by its outer surface 14, presses the composite 6 against the inside surface 10 of the mold 7, thereby reducing the swelling of the resin and fiber layers, expelling air bubbles trapped between the layers, releasing gaseous components and implementing compaction of the composite 6. The silicone-elastomer layer 13 expands substantially as a solid body and imparts its shape to the composite 6. In this manner, the core 11 is able to uniformly press the composite 6 against the inner surface 10 of the mold 7 and to tension the reinforcing fibers of the composite 6 even into angular recesses 15 of the component 1. This feature cannot be carried out accurately using the balloon-molding technique of the prior art.

In this embodiment, the component has a width $L_1$=75 mm and comprises 7 layers or plies of resin-preimpregnated fabrics which, following cladding, form a thickness a=3.15 mm and which, following compression and polymerization constitute a thickness a'=2.31 mm corresponding to a compression ratio of 28%. The resin is polymerized by a gradual increase in temperature to T1=320° C., which is 295° C.

above the ambient temperature. The component is then manufactured under the following conditions:

a steel mold having a thermal coefficient of expansion $\alpha_3=12\times10^{-6}/°$ C.;

a core of width $L_2=68.70$ mm;

a water-soluble ceramic body CERAMCOR 316 (trademark of Ceramic Core Systems Ltd) having a thermal-expansion coefficient $\alpha_2=70\times10^{-6}/°$ C. and of a width $L_3=60.94$ mm;

layer of silicone-elastomer RTV141 (trademark of Rhodorsil) having a thermal coefficient of expansion $\alpha_1=300\times10^{-6}$ and a thickness e=3.88 mm on each side of the core, this elastomer disintegrating near 300° C.

Figure 2:
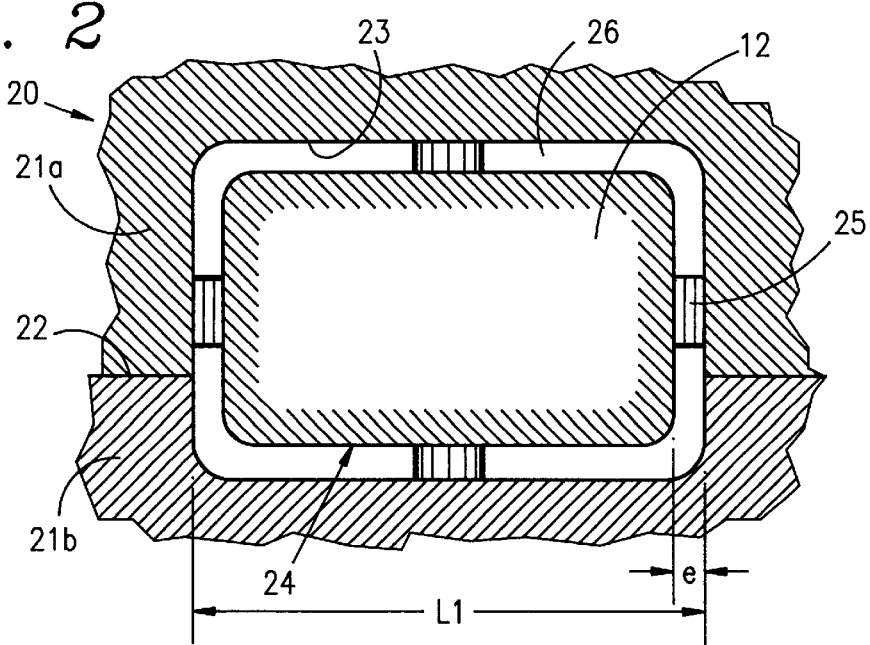
FIG. 2 illustrates the molding principle for a core according to the invention, the spacer thicknesses being shown exaggerated for clarity.

With respect to FIG. 2, the core 11 is manufactured using the following method:

using a mold 20 having two half-molds 21a, 21b which are separated by a junction plane 22, the mold's internal surface 23 being complementary to the outer surface 14 of FIG. 1;

conventionally fabricating the water-soluble ceramic body 12;

positioning the body 12 inside the mold 20 using spacers 25 made of silicone elastomer, and of thickness e, between the outer surface 24 of the body 12 and the inner surface 23 of the mold 20, thereby defining a space 26 assuming the precise shape of the silicone-elastomer layer 13 of FIG. 1. In practice, the spacers 25 are bonded to the surface 24 of the body 12;

pouring the liquid silicone elastomer into the space 26, followed by polymerization and removal of the core.

It should be noted that these cores can be stored without special precautions because the silicone-elastomer layer protects the comparatively fragile ceramic body.

Figure 3:
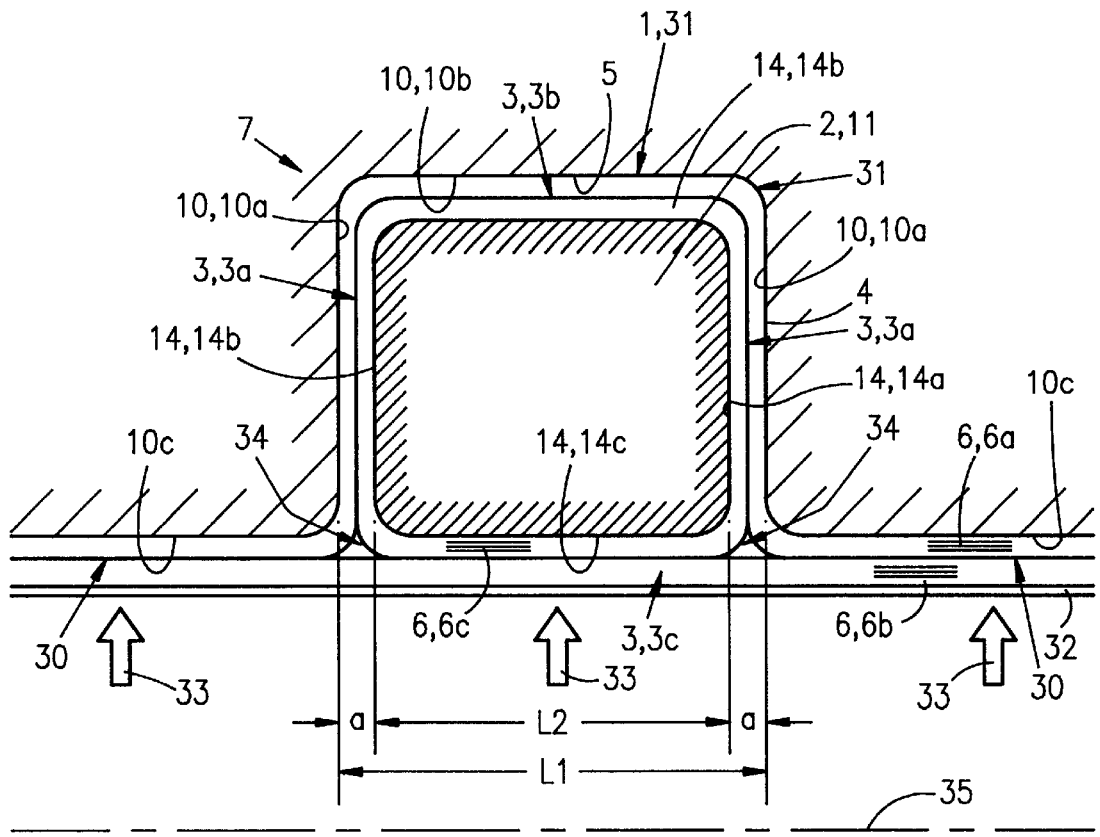
FIG. 3 illustrates the molding operation for a complex component comprising a hollow portion adjacent to non-enclosing walls, in this instance a gas turbine engine casing with an air manifold, the thicknesses of the silicone-elastomer layer and of the walls being exaggerated for clarity.

In the embodiment shown in FIG. 3, the component 1 comprises the enclosing wall 3 subtending the cavity 2 and two non-enclosing walls 30 adjacent to the enveloping wall 3. In this embodiment, the mold 7 is integral and its shaping surface 10 comprises a mold-cavity 31 having the shape of the enclosing wall 3. The surface 10 is divided into two mutually opposite side surfaces 10a and an end surface 10b, the surfaces 10a and 10b constituting the mold-cavity 31. Surface 10 is further divided into surfaces 10c which are non-enclosing walls. The core 11 is manufactured in the above manner to conform to the mold-cavity 31. The component 1 is manufactured as follows:

at least one layer of resin-preimpregnated fibers is applied against the surfaces 10, 10a, 10b, 10c of the mold 1 in order to constitute a first composite layer 6a;

the core 11 is positioned inside the cavity 2 within the mold-cavity 31;

at least one layer of resin-impregnated fibers is deposited on the core 11 and the first composite layer 6a in order to constitute a second composite layer 6b which together with the composite layer 6a forms the enclosing walls 3 and the non-enclosing walls 30 of the component 1;

covering the component edges (not shown) with an impermeable film 32 to seal the mold 7;

insertion into the autoclave and resin polymerization at the required temperature-and-pressure conditions 33 for the given resin.

The cores 11 also may be clad with at least one layer of preimpregnated fibers to constitute a composite layer 6c fully padding the cavities and enhancing the crack-resistance of the component 1 in the zones 34 where the non-enclosing walls 30 are adjacent to the enclosing walls 3, 3a, 3b, 3c.

Under the influence of the rising polymerization temperature, the core 11 of the invention will expand and compress the sides 3a of the enclosing walls 3 against the sides 10a of the mold 7 under the conditions already discussed above.

As a consequence of the pressure 33 applied in the autoclave during polymerization on the film 32:

the non-enveloping walls 30 are compacted and shaped against the surface 10c of the mold 7;

the core 11 is forced toward the end of the mold-cavity 31, enabling compaction of and shaping of the portion 3b of the enclosing wall 3 between the end 10b of the mold-cavity 31 and the surface 14b of the core 11 oppositely located;

the portion 3c of the enclosing wall is compacted and shaped against the surface 14c of the core 11 oppositely located.

In case the enclosing wall portion 3c projects beyond the non-enclosing wall 30, the thermal expansion of the core 11 of the invention also offers the advantage of retensioning the fibers of the composite and thus smoothing such fibers' wrinkles which are caused by the pressure in the autoclave 33. Such wrinkles per se would otherwise reduce the strength of the composite wall 3c.

The invention is not restricted to the above-described embodiments, but on the contrary covers all variations that may be introduced without transcending scope or spirit of the appended claims.

Accordingly, a core 11 may comprise several elements subsequently positioned one against the other and fitted as called for with mutual positioning and bonding means in order to constitute geometrically complex cavities or cavities that differ excessively from the spherical or cubic shapes. Illustratively, the casing 1 of the second illustrative implementation of the invention may be annular and symmetrically positioned about an axis 35, in which event the cavity 2 would be toroidal around this axis 35. In such a case, the core 11 is advantageously composed of several segments configured separately inside the mold-cavity.

Depending on the desired effect, the junction planes between the segments may, or may not, be clad with silicone elastomer. It should be kept in mind that the expansion of the silicone elastomer will fill the unavoidable gaps that form at the core surface at the junction planes of the cores, and only minute traces will be left at the cavity surface.

What is claimed is:

1. A method for manufacturing a hollow component made of a hot-polymerizing resin/fiber composite, the component (1) comprising enclosing walls (3) which subtend at least one cavity (2), the method using a mold (7) which forms the outside shape of the component (1), the method comprising the steps of:

providing at least one dual-element core (11) which corresponds to the shape of the at least one cavity (2), wherein the at least one core (11) comprises a body (12) clad by a silicone-elastomer layer (13) having a thermal expansion coefficient a higher than a thermal expansion coefficient of the body (12) and a thermal expansion coefficient of the mold (7), and a thickness "e" selected to provide a desired compression to be applied to the fiber composite;

cladding the at least one core (11) with at least one resin preimpregnated layer of fiber to form the composite (6) for the component (1);

arranging the at least one core and the composite (6) in the mold (7);

hot-polymerizing the resin such that the at least one core (11) exerts an outward compression, generated by thermal expansion of said silicone-elastomer layer during resin polymerization, against the composite (6), wherein said body (12) and said silicone-elastomer layer (13) expand as a solid during resin polymerization; and disintegrating the silicone-elastomer layer (13) during resin polymerization, said silicone-elastomer layer (13) having a disintegration temperature which is less than the final resin-hardening temperature of the resin, wherein said body (12) is removed from said hollow composite after resin polymerization.

2. The method according to claim 1, wherein the outward compression of the composite (6) is at least 30% of a pre-compression thickness "a" of the composite (6).

3. The method according to claim 1, wherein the thickness "e" of the silicone-elastomer layer (13) is at least 3 mm and the thermal expansion coefficient of the silicone-elastomer layer (13) is at least $1,000 \times 10^{-6}/°$ C.

4. The method according to claim 1, wherein the body (12) of the at least one core (11) is made of a water-soluble material, the method comprising the further step of:

dissolving the body (12) of the at least one core (11) in water to facilitate its removal from the at least one cavity (2).

5. The method according to claim 4, wherein the component (1) is molded without an aperture in the enclosing walls (3) to simplify cladding and molding.

6. The method according to claim 5, comprising the further step of:

perforating at least one of the enclosing walls (3) after molding to facilitate removal of the at least one core (11) by rinsing.

7. The method according to claim 1, wherein the mold (7) is a mold (20) having walls 23 which corresponds to the shape and dimensions of the at least one core (11) when cold and wherein the manufacturing of the at least one core (11) comprises the steps of:

manufacturing the body (12);

arranging the body (12) in the mold (20) and inserting crosslinked silicone elastomer spacers (25) between the body (12) and the walls (23) of the mold (20) to form a remnant free space (26), each spacer (25) having a thickness equal to a desired thickness of the silicone-elastomer layer (13) at that site;

pouring liquid silicone-elastomer into the remnant free space (26);

cold crosslinking the silicone-elastomer; and removing the at least one core (11).

8. A method for manufacturing a complex component (1) made of a composite (6), the component (1) comprising enclosing walls (3, 3a, 3b, 3c), which enclose and subtend at least one cavity (2), and non-enclosing walls (30) adjacent to the enclosing walls (3), the method using a mold (7) comprising shaping surfaces (10c) which corresponds to the shape of the non-enclosing walls (30) and at least one mold cavity (31) which corresponds to the shape of the enclosing walls (3a, 3b) and has sides (10), the method comprising the steps of:

cladding the mold (7) with at least one resin preimpregnated layer of fibers comprising a first layer (6a) of the composite (6);

providing at least one dual-element core (11) which corresponds to the shape of the at least one cavity (2), wherein the at least one core (11) comprises a body (12) clad by a silicone-elastomer layer (13) having a thermal expansion coefficient a higher than a thermal expansion coefficient of the body (12) and a thermal expansion coefficient of the mold (7), and a thickness "e" selected to provide a desired compression force to the fiber composite;

placing the at least one core (11) into the at least one mold cavity (31) onto the first composite layer (6a);

cladding the at least one core with at least a second resin preimpregnated layer of fibers comprising a second layer (6b, 6c) of the composite (6);

covering the at least one core (11) and the composite (6a, 6b, 6c) with an impermeable film (32) to seal the core (11) and composite (6a, 6b, 6c) from the mold (7);

autoclave compressing and hot-polymerizing the resin such that the at least one core (11) exerts an outward compression, generated by thermal expansion of said silicone-elastomer layer during resin polymerization, on the composite (6a) which is blocked by the sides (10) of the at least one mold cavity (31), wherein said body (12) and said silicone-elastomer layer (13) expand as a solid during resin polymerization; and disintegrating the silicone-elastomer layer (13) during resin polymerization with the silicone-elastomer layer (13) having a disintegration temperature which is less than the final resin-hardening temperature of the resin, wherein said body (12) is removed from said hollow composite after resin polymerization.

9. The method according to claim 8, further comprising the step of:

cladding the at least one core (11) with at least one resin preimpregnated layer of fibers before arranging the at least one core (11) in the at least one mold cavity (31).

10. The method according to claim 8, wherein the outward compression is at least 30% of the thickness of one of the enclosing walls (3).

11. The method according to claim 8, wherein the appropriate thickness "e" of the silicone-elastomer layer (13) is at least 3 mm and the thermal expansion coefficient α of the silicone-elastomer layer (13) is at least $1,000 \times 10^{-6}/°$ C.

12. The method according to claim 8, wherein the body (12) of the at least one core (11) is made of a water-soluble material, the method comprising the further step of:

dissolving the body (12) of the at least one core (11) in water to facilitate its removal from the at least one cavity (2).

13. The method according to claim 12, wherein the component (1) is molded without an aperture in the enclosing walls (3) to simplify cladding and molding.

14. The method according to claim 13, comprising the further step of:

perforating at least one of the enclosing walls (3) after molding to facilitate removal of the at least one core (11) by rinsing.

15. The method according to claim 8, wherein the mold (7) is a mold (20) having walls (23) which corresponds to the shape and dimensions of the at least one core (11) when cold and wherein the manufacturing of the at least one core (11) comprises the steps of:

manufacturing the body (12);

arranging the body (12) in the mold (20) and inserting crosslinked silicone elastomer spacers (25) between the body (12) and the walls (23) of the mold (20) to form a remnant free space (26), each spacer (25) having a thickness equal to a desired thickness of the silicone-elastomer layer (13) at that site;

pouring liquid silicone-elastomer into the remnant free space (26);

cold crosslinking the silicone-elastomer; and removing the at least one core (11).

* * * * *

UNITED STATES PATENT AND TRADEMARK OFFICE
CERTIFICATE OF CORRECTION

PATENT NO.    : 6,264,868 B1
DATED         : July 24, 2001
INVENTOR(S)   : Marchant It is certified that error appears in the above-identified patent and that said Letters Patent is hereby corrected as shown below:

Column 3,
Line 17, after "expansion" change "a" to -- $\alpha$ --.

Column 5,
Line 32, after "expansion" change "a" to -- $\alpha$ --.
Line 54, "Figure." should read -- Figures --.

Column 7,
Line 13, after "$10^{-6}$" insert -- 1 °C. --.

Column 8,
Line 56, "a" (first occurrence) should read -- $\alpha$ --.

Signed and Sealed this

Twenty-first Day of January, 2003

JAMES E. ROGAN
*Director of the United States Patent and Trademark Office*